United States Patent
Lee et al.

(10) Patent No.: US 9,231,738 B2
(45) Date of Patent: Jan. 5, 2016

(54) COMMUNICATION METHOD FOR RELAY NODE AND NEXT NODE OF THE RELAY NODE FOR NETWORK CODING

(75) Inventors: In Sun Lee, Seongnam-si (KR); Chan Soo Hwang, Giheung-gu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 476 days.

(21) Appl. No.: 12/984,714

(22) Filed: Jan. 5, 2011

(65) Prior Publication Data

US 2011/0164621 A1 Jul. 7, 2011

(30) Foreign Application Priority Data

Jan. 15, 2010 (KR) .................. 10-2010-0003824
Aug. 16, 2010 (KR) .................. 10-2010-0078697

(51) Int. Cl.
*H04L 12/28* (2006.01)
*H04L 1/18* (2006.01)
*H04L 1/00* (2006.01)
*H04B 7/155* (2006.01)
*H04L 1/16* (2006.01)
*H04W 40/24* (2009.01)
*H04W 84/18* (2009.01)

(52) U.S. Cl.
CPC ............. *H04L 1/18* (2013.01); *H04B 7/15521* (2013.01); *H04L 1/0076* (2013.01); *H04L 1/1635* (2013.01); *H04L 2001/0097* (2013.01); *H04W 40/24* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 2007/0274324 A1* | 11/2007 | Wu et al. ...................... | 370/400 |
| 2009/0086664 A1 | 4/2009 | Wu | |
| 2009/0196214 A1 | 8/2009 | Li et al. | |
| 2009/0323580 A1* | 12/2009 | Xue et al. ...................... | 370/315 |
| 2010/0046371 A1* | 2/2010 | Sundararajan et al. ........ | 370/235 |
| 2011/0013562 A1* | 1/2011 | Levkowetz ................... | 370/328 |

FOREIGN PATENT DOCUMENTS

| | | |
|---|---|---|
| JP | 2009-049617 | 3/2009 |
| KR | 10-2009-0024313 | 3/2008 |
| KR | 10-2009-0054759 | 6/2009 |
| KR | 10-2009-0065308 | 6/2009 |

OTHER PUBLICATIONS

Hiroyuki Yomo et al., Opportunistic Scheduling for Network Coding, 2007, IEEE, pp. 5610-5615.*
Katti et al., XORs in the Air: Practical Wireless Network Coding, Jun. 2008, IEEE/ACM Transactions on Networking, vol. 16, No. 3, pp. 497-510.*

* cited by examiner

*Primary Examiner* — Nicholas Sloms
(74) *Attorney, Agent, or Firm* — NSIP Law

(57) ABSTRACT

Provided is a communication method of a relay node for network coding, including determining one of a plurality of nodes included in a mesh network as a relay node to perform network coding; determining, by the relay node among the plurality of nodes, nodes capable of participating in the network coding; and performing the network coding with respect to the nodes capable of participating in the network coding.

10 Claims, 13 Drawing Sheets

FIG. 12

| ENCODED_NUM | |
|---|---|
| Source add. | Packet # |
| Source add. | Packet # |
| Source add. | Packet # |
| ... | |

Packets XOR-ed together {

| Ack_NUM 1230 | | | |
|---|---|---|---|
| Source add. 1233 | First Packet # 1235 | Last Packet # 1237 | Bitmap |
| Source add. | First Packet # | Last Packet # | Bitmap |
| ... | | | |

COMMUNICATION METHOD FOR RELAY NODE AND NEXT NODE OF THE RELAY NODE FOR NETWORK CODING

CROSS-REFERENCE TO RELATED APPLICATION(S)

This application claims the benefit under 35 U.S.C. §119(a) of Korean Patent Application No. 10-2010-0003824, filed on Jan. 15, 2010, and Korean Patent Application No. 10-2010-0078697, filed on Aug. 16, 2010, in the Korean Intellectual Property Office, the entire disclosures of which are incorporated herein by reference for all purposes.

BACKGROUND

1. Field

The following description relates to a communication method of a relay node and a next node of the relay node for network coding.

2. Description of Related Art

In a mesh network generally including terminals, for example, nodes without using an infrastructure, a unicast communication may be enabled between the nodes. In particular, when at least two unicast communications are enabled between nodes, network coding may be employed.

SUMMARY

The following description relates to a method of determining a relay node included in a mesh network along with nodes in the mesh network capable of participating in network coding performed by the relay node.

The foregoing and/or other features and aspects may be achieved by providing a communication method of a relay node for network coding, the method including determining one of a plurality of nodes included in a mesh network as a relay node to perform network coding, determining, by the relay node among the plurality of nodes, nodes capable of participating in the network coding, and performing, by the relay node, the network coding with respect to the nodes capable of participating in the network coding.

The performing may include requesting next nodes of the relay node among the nodes capable of participating in the network coding to overhear packets broadcast from previous nodes of the relay node, and performing the network coding based on the overheard packets.

The determining of the relay node may include determining whether at least two unicast sessions are executed in one of the plurality of nodes, and determining, as the relay node, the one node in which the at least two unicast sessions are executed.

The determining of the nodes capable of participating in network coding may include verifying whether next nodes of the relay node among the plurality of nodes are neighbors of previous nodes of the relay node, and determining, as the nodes capable of participating into the network coding, the next nodes of the relay node and the previous nodes of the relay node in response to the next nodes of the relay node being the neighbors of the previous nodes of the relay node.

Each of the previous nodes of the relay node and the next nodes of the relay node may generate a neighbor list containing information associated with neighbor nodes. The verifying may include requesting, by the relay node, the previous nodes of the relay node to transmit the neighbor list, and verifying, by the relay node using the neighbor lists, whether the next nodes of the relay node are the neighbors of the previous nodes of the relay node.

Each of the previous nodes of the relay node and the next nodes of the relay node may generate a neighbor list containing information associated with neighbor nodes. The verifying may include periodically receiving, by the relay node from each of the previous nodes of the relay node, the neighbor list of each corresponding previous node, and verifying, by the relay node using the neighbor lists, whether the next nodes of the relay node are the neighbors of the previous nodes of the relay node.

The performing may include receiving, from each of the next nodes of the relay node, an acknowledgement with respect to each of the overheard packets, and determining a packet to which the network coding is to be performed based on the received acknowledgement.

The communication method may further include determining whether an execution state of the at least two unicast sessions is changed, and changing the nodes capable of participating in the network coding, or terminating the network coding in response to the execution state of the at least two unicast sessions being changed.

The determining whether the execution state is changed may include determining whether the at least two unicast sessions passing through the relay node remain, requesting nodes of which the at least two unicast sessions are terminated among the next nodes of the relay node to suspend overhearing, based on the remaining at least two at least two unicast sessions, updating the previous nodes of the relay node and the next nodes of the relay node based on the remaining at least two unicast sessions, and performing the network coding using packets overheard by the updated next nodes of the relay node.

The communication method may further include generating at least one queue with respect to each of previous nodes of the relay node and next nodes of the relay node.

In response to the relay node performing network coding with respect to a packet, a header of the packet may include a first area including information associated with the network coding, a second area including information associated with the packet overheard by a next node of the relay node, and a flag indicating whether the network coding is enabled with respect to the packet or whether an acknowledgement is enabled with respect to the packet.

The first area may include a number of network coded packets, an address of a previous node of the relay node receiving the overheard packet, and an identification number of a network coded packet.

The second area may include a number of packets overheard by the next node of the relay node, an address of a previous node broadcasting a packet overheard by a corresponding next node, and an identification number of the overheard packet.

The foregoing and/or other features and aspects may also be achieved by providing a communication method of a next node of a relay node for network coding, the method including receiving an overhear request from the relay node that is one of a plurality of nodes included in a mesh network, overhearing, by the next node of the relay node in response to the overhear request, a packet broadcast from a corresponding previous node of the relay node, and transmitting, by the next node of the relay node, an acknowledgement with respect to the overheard packet based on a time offset used to overhear the packet and a number of to overheard packets.

The transmitting may include comparing the time offset with a predetermined duration, and generating the acknowledgment with respect to the overheard packet in response to the time offset being greater than the predetermined duration.

The transmitting may include counting, by the next node of the relay node, the number of overheard packets, and generating the acknowledgment with respect to the overheard packet in response to the number of overheard packets being greater than a predetermined threshold.

The generating may include generating a header of the packet for the acknowledgment using a bitmap.

The foregoing and/or other features and aspects may also be achieved by providing a non-transitory computer-readable medium including a program for instructing a computer to perform a communication method of a relay node for network coding, the method including determining one of a plurality of nodes included in a mesh network as a relay node to perform network coding, determining, by the relay node among the plurality of nodes, nodes capable of participating in the network coding, and performing, by the relay node, the network coding with respect to the nodes capable of participating in the network coding.

According to an aspect, in a wireless mesh environment including terminals, overhearing and broadcasting of a packet may be performed using only nodes capable of participating into network coding based on a neighbor list. Accordingly, it is possible to prevent network flooding.

According to an aspect, by directly transmitting an acknowledgment with respect to an overheard packet to a relay node, it is possible to reduce a deterioration of a decoding probability in a next node that may occur due to a delay between a previous node of the relay node and a next node of the relay or a packet loss. Accordingly, a network throughput may be enhanced.

According to an aspect, by transmitting a cumulative acknowledgement with respect to a packet overheard by a next node of a relay node, it is possible to decrease overhead occurring due to transmission of the acknowledgement.

Other features and aspects will be apparent from the following detailed description, the drawings, and the claims.

BRIEF DESCRIPTION OF THE DRAWINGS

These and/or other aspects will become apparent and more readily appreciated from the following description of various example embodiments, taken in conjunction with the accompanying drawings briefly described below.

FIG. 12 is a diagram illustrating an example of a header of a packet to transmit a cumulative ACK using a bitmap.

Figure 1:
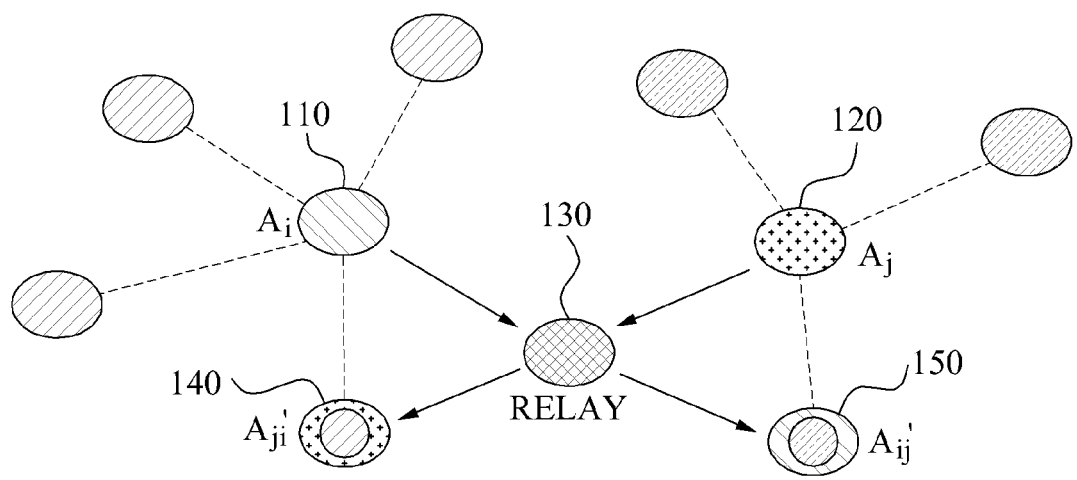
FIG. 1 is a diagram illustrating an example of network coding in a relay node.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of operations is not limited to that set forth herein and may be changed as is known in the art, with the exception of operations necessarily occurring in a certain order. Also, description of well-known functions and constructions may be omitted for increased clarity and conciseness.

FIG. 1 illustrates an example of network coding in a relay node.

In a case in which a mesh network is configured using terminals, for example, nodes without using an infrastructure, XOR based network coding may be employed to enhance a network throughput. In particular, in a case in which a route for at least two unicast sessions in the mesh network includes a single common node, it is possible to enhance the network throughput by performing network coding in the common node.

When the route for the at least two unicast sessions is commonly included in a predetermined node, the predetermined node may correspond to a relay node.

Referring to FIG. 1, in a mesh network including a plurality of nodes, a node $A_i$ 110 and a node $A_j$ 120 correspond to previous nodes of a relay node 130, and a node $A_{ji}'$ 140 and a node $A_{ij}'$ 150 correspond to next nodes of the relay node 130.

In one example configuration, one or more of the plurality of nodes may be mobile terminals.

In this example, it is assumed that the node $A_i$ 110 has a packet a and the node $A_j$ 120 has a packet b. The packet a may be transferred from the previous node $A_i$ 110 to the next node $A_{ij}'$ 150 via the relay node 130. Similarly, the packet b may be transferred from the previous node $A_j$ 120 to the next node $A_{ji}'$ 140 via the relay node 130.

In this example, when the previous node $A_i$ 110 broadcasts the packet a, the next node $A_{ji}'$ 140 adjacent to the previous node $A_i$ 110 may overhear the packet a.

When the previous node $A_j$ 120 broadcasts the packet b, the next node $A_{ij}'$ 150 adjacent to the previous node $A_j$ 120 may overhear the packet b.

The relay node 130 may broadcast the packets a and b through network coding using XOR. The next node $A_{ji}'$ 140 and the next node $A_{ij}'$ 150 receiving the respective network coded packets may decode the received network coded packets using a corresponding overheard packet to restore the packets a and b.

In a case in which next nodes of the relay node 130, for example, the nodes $A_{ji}'$ 140 and $A_{ij}'$ 150, are capable of decoding the network coded packet, the relay node 130 may perform network coding.

In a case in which the next nodes of the relay node 130 do not perform decoding, a packet desired to be received by a corresponding next node may not be properly transferred.

In a network coding method according to an example embodiment, a single unicast session including previous node $A_i$ 110→relay node 130→next node $A_{ij}'$ 150 may communicate with another unicast session including previous node $A_j$ 120→relay node 130→next node $A_{ji}'$ 140 by employing the relay node 130 as an intersecting point.

Each of the nodes described above may have information associated with neighbor nodes. For example, in an 802.11 system, each of the nodes may have information associated with the neighbor nodes according to 802.11s peering management. Each of the nodes may express two unicast sessions formed by a routing protocol, or a portion of the two unicast sessions.

With respect to a packet broadcast from the previous node $A_i$ 110, the next node $A_{ji}'$ 140 may verify that a node broadcasting the packet corresponds to the previous node $A_i$ 110, and may perform overhearing.

The next node $A_{ji}'$ 140 may verify that the node broadcasting the packet corresponds to the previous node $A_i$ 110 by verifying a sender address of the packet.

The next node $A_{ji}'$ 140, having overheard the packet, may transmit an acknowledgement (ACK) with respect to the overheard packet to inform the relay node 130 about the overheard packet.

The relay node 130 may receive the ACK from the next node $A_{ji}'$ 140, and may verify which packet needs to be network coded, so that the next node $A_{ji}'$ 140 of the relay node 130 may perform decoding.

Hereinafter, an example of a relay node and nodes capable of participating in network coding in a case in which a plurality of nodes are included in a mesh network will be described with reference to FIG. 2.

Figure 2:
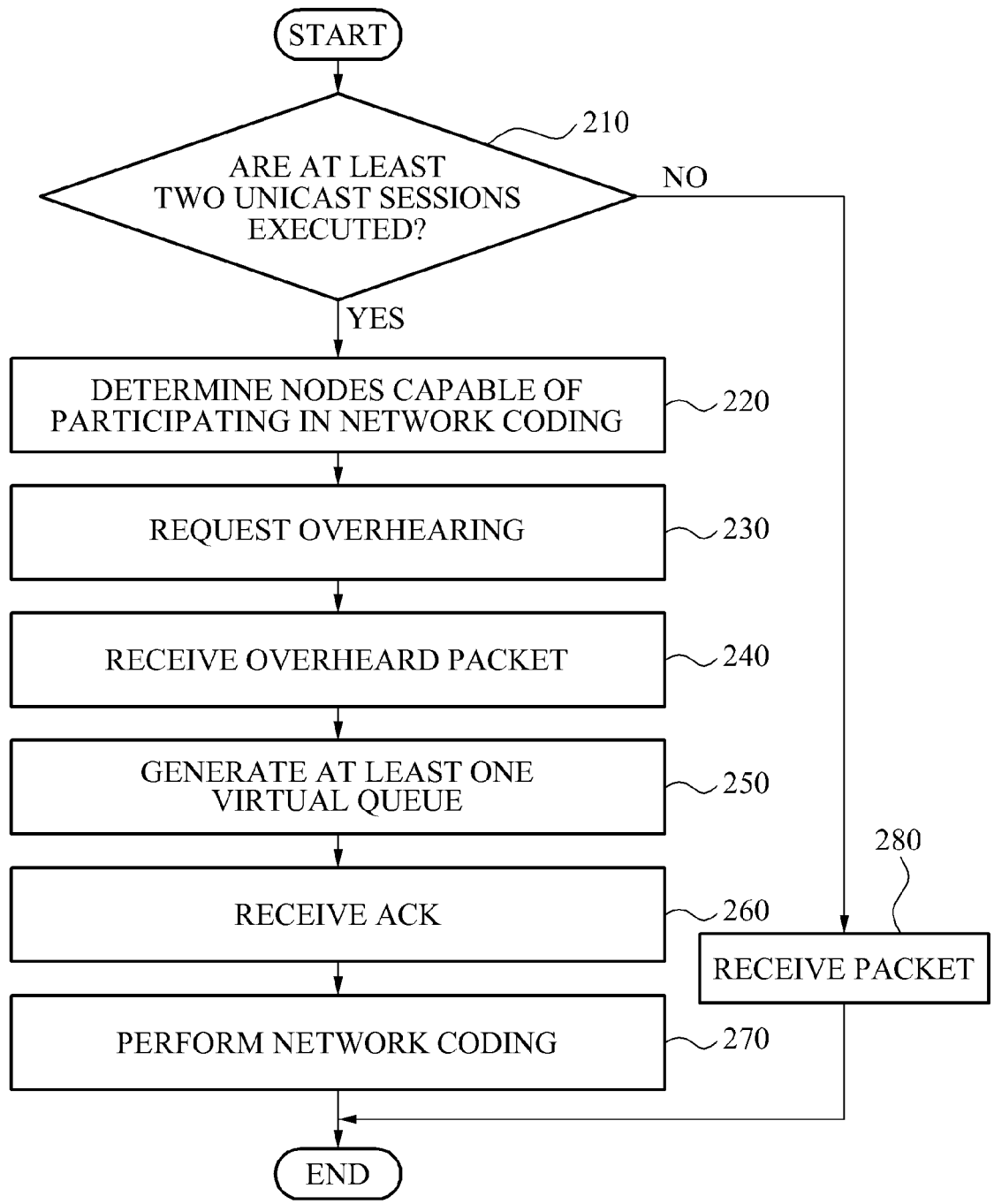
FIG. 2 is a diagram illustrating an example of a communication method of a relay node for network coding.

FIG. 2 illustrates an example of a communication method of a relay node for network coding.

Referring to FIG. 2, the communication method of the relay node for network coding may determine one of a plurality of nodes included in a mesh network as a relay node having an opportunity of network coding.

In operation 210, the relay node may be determined depending on whether at least two unicast sessions are executed in one of the plurality of nodes.

In the case in which the at least two unicast sessions are executed in one of the plurality of nodes, the corresponding node may be determined as the relay node.

For example, in an aspect of a node, in a case in which a unicast session is open in the node and at least two unicast sessions pass through the node, the node may correspond to the relay node.

In a case in which the node does not correspond to the relay node, in other words, the node is not determined to be the relay node, the node may wait to receive a packet in operation 280.

When the node is determined to be the relay node in operation 210, in operation 220 the relay node may determine nodes capable of participating in network coding among the plurality of nodes.

The nodes capable of participating into network coding may be determined as described below.

The relay node may verify whether next nodes of the relay node among the plurality of nodes are neighbors of previous nodes of the relay node.

In a case in which the next nodes are neighbors of the previous nodes, the relay node may determine the next nodes and the previous nodes as the nodes capable of participating in network coding.

For example, the relay node may determine the nodes capable of participating in network coding by verifying whether next nodes of each unicast session are neighbors of previous nodes of another unicast session.

For example, referring to FIG. 1, the relay node 130 may determine whether the previous node $A_i$ 110 and the next node $A_{ji}'$ 140 correspond to nodes capable of participating in network coding by verifying whether the next node $A_{ji}'$ 140 of another unicast session is a neighbor of the previous node $A_i$ 110 in a single unicast session including previous node $A_i$ 110→relay node 130→next node $A_{ij}'$ 150.

Similarly, the relay node 130 may determine whether the previous node $A_j$ 120 and the next node $A_{ij}'$ 150 correspond to nodes capable of participating in network coding by verifying whether the next node $A_{ij}'$ 150 of the single unicast session is a neighbor of the previous node $A_j$ 120 in the other unicast session including previous node $A_j$ 120→relay node 130→next node $A_{ji}'$ 140.

Since a direct communication between a previous node and a next node in the same unicast session is enabled, a comparison may not be performed to determine whether corresponding nodes may participate in network coding. In addition, whether the nodes are neighbors may not be verified.

A method of verifying, by a relay node, whether next nodes of the relay node among a plurality of nodes are neighbors of previous nodes of the relay node will be described later with reference to FIG. 3 and FIG. 4.

In response to the nodes capable of participating in network coding being determined, the relay node may perform network coding with respect to the determined nodes.

The nodes capable of participating in network coding may vary based on a state of unicast sessions. A method of changing the nodes capable of participating in network coding in response to the state of the unicast sessions being changed will be described later with reference to FIG. 5.

In operation 230, the relay node may request next nodes of the relay node among the nodes capable of participating in network coding to overhear packets broadcast from previous nodes of the relay node.

In operation 240, the relay node may receive the overheard packets from the next nodes.

A format of a packet header used in a communication method for network coding according to an example embodiment will be described later with reference to FIG. 6.

In operation 250, the relay node may generate at least one queue with respect to each of the previous nodes and the next nodes. Attendant to initiating network coding, the relay node may generate at least one virtual queue with respect to each of the previous nodes and the next nodes. A sequence of generating the at least one queue is not limited to that illustrated in FIG. 2.

In operation 260, the relay node may receive an ACK with respect to each of the overheard packets from each of the next nodes.

In operation 270, the relay node may determine a packet to which network coding is to be performed, based on the received ACK, and perform the network coding.

A method of generating, by the relay node, at least one queue, and performing network coding using the at least one queue will be described later with reference to FIGS. 7 through 9.

As previously described, in operation 280, in response to the at least two unicast sessions not being executed in one of the plurality of nodes, the corresponding node may not correspond to the relay node, and thus simply receives a packet.

Figure 3:
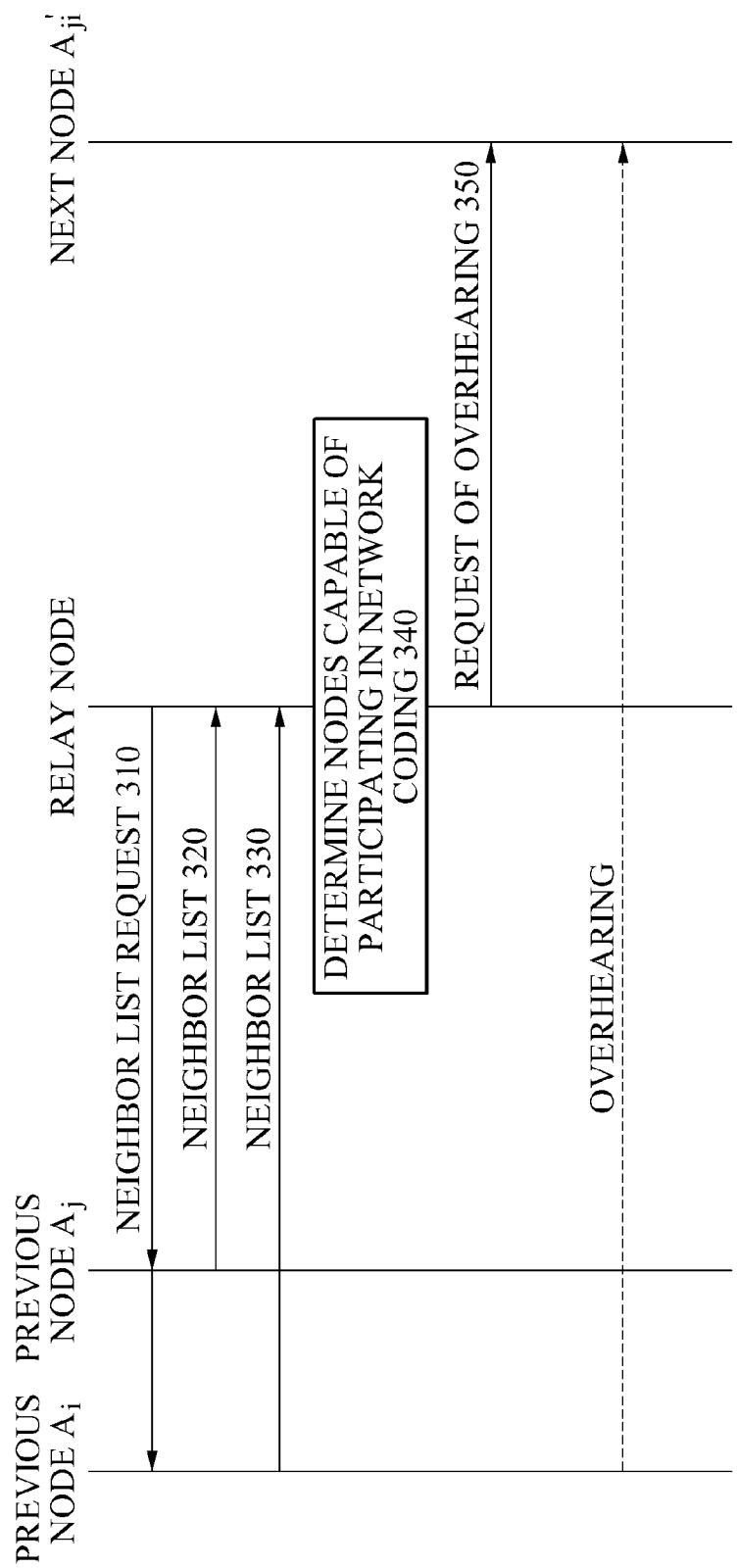
FIG. 3 is a diagram illustrating an example of a method of verifying whether next nodes of a relay node are neighbors of previous nodes of the relay node.

FIG. 3 illustrates an example of a method of verifying whether next nodes of a relay node are neighbors of previous nodes of the relay node.

Referring to FIG. 3, to verify whether the next nodes are neighbors of the previous nodes, the relay node may request previous nodes $A_i$ and $A_j$ to transmit a neighbor list in operation 310.

In operations 320 and 330, in response to the request from the request from the relay node, the relay node may receive a neighbor list of a corresponding previous node from each of the previous nodes $A_i$ and $A_j$.

Each of the previous nodes and the next nodes may include the neighbor list containing information associated with neighbor nodes of a corresponding node, and thus may inform the relay node about information associated with the neighbor nodes.

For example, the neighbor list may be a list containing information associated with a 2-hop neighbor.

In operation 340, the relay node may determine nodes capable of participating in network coding by verifying whether the next nodes are neighbors of the previous nodes using the neighbor lists.

In operation 350, the relay node may request the nodes determined to be capable of participating in network coding, for example, a next node $A_{ji}'$, to overhear the neighboring previous node $A_i$. In response to the request, the next node $A_{ji}'$ may overhear a packet broadcast from the previous node $A_i$.

Figure 4:
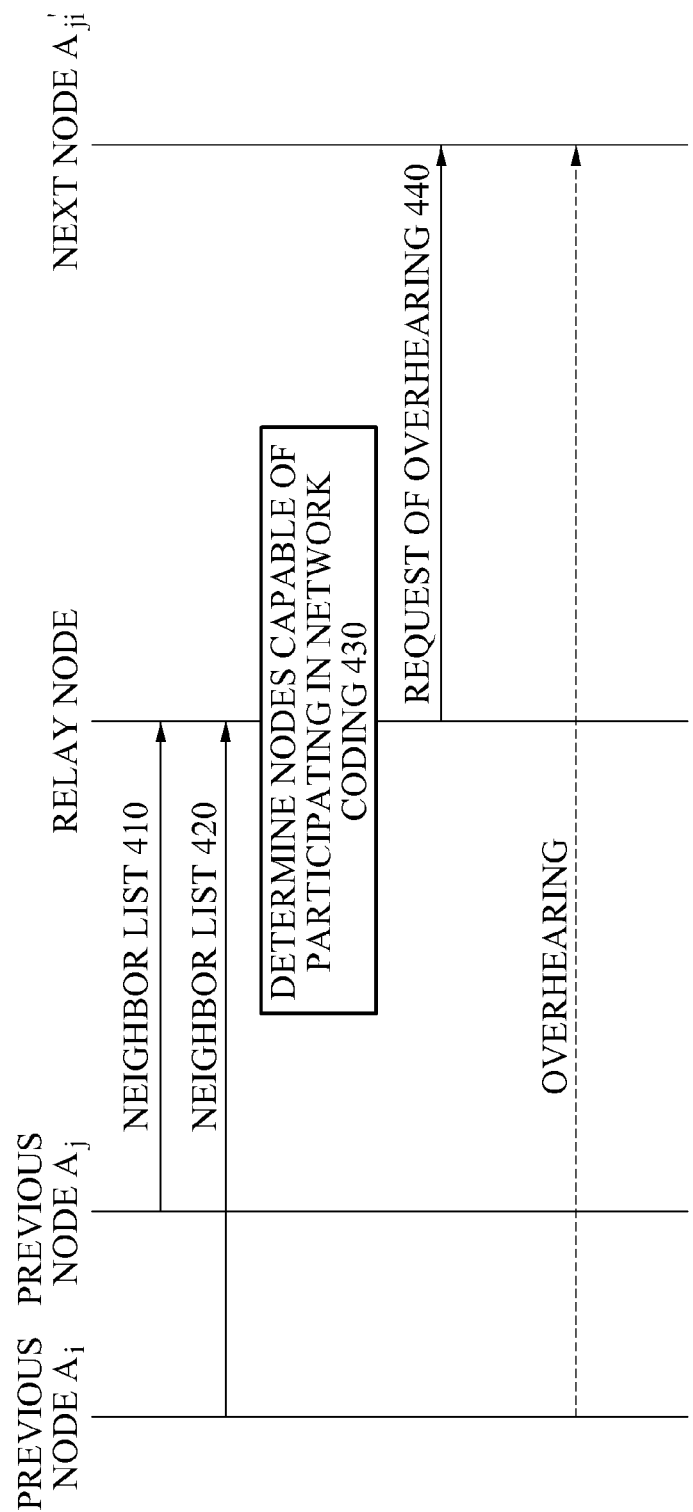
FIG. 4 is a diagram illustrating another example of a method of verifying whether next nodes of a relay node are neighbors of previous nodes of the relay node.

FIG. 4 illustrates another example of a method of verifying whether next nodes of a relay node are neighbors of previous nodes of the relay node.

Referring to FIG. 4, to verify whether the next nodes are neighbors of the previous nodes, the relay node may periodically receive a neighbor list of a corresponding previous node from each of previous nodes $A_i$ and $A_j$ in operations 410 and 420.

In operation 430, the relay node may determine nodes capable of participating in network coding by verifying whether the next nodes are neighbors of the previous nodes using the neighbor lists.

In operation 440, the relay node may request the nodes capable of participating in network coding, for example, a next node $A_{ji}'$ to overhear the neighboring previous node $A_i$. In response to the request, the next node may overhear the packet broadcast from the previous node $A_i$.

As described above with reference to FIG. 3 and FIG. 4, each of a plurality of nodes may transmit a corresponding neighbor list to a relay node so that the relay node may verify neighbor nodes of the respective nodes transmitting the neighbor lists.

For example, it may be assumed that a neighbor list of the previous node $A_i$ is $N_{Ai}$, and a neighbor list of the previous node $A_j$ is $N_{Aj}$.

The relay node may receive the neighbor lists $N_{Ai}$ and $N_{Aj}$, and may verify whether corresponding next nodes $A_{ij}'$ and $A_{ji}'$ are neighbors of the previous nodes $A_i$ and $A_j$.

For example, the relay node may verify whether the next node $A_{ji}'$ is included in the neighbor list $N_{Ai}$ of the previous node $A_i$. In response to the next node $A_{ji}'$ being included in the neighbor list $N_{Ai}$, the relay node may request the next node $A_{ji}'$ to overhear some or all of the data from node $A_i$, that is, some or all of the packets transmitted from the previous node $A_i$.

The next node $A_{ji}'$ may overhear data transmitted from the previous node $A_i$, and may broadcast a packet by including the overheard data in the packet. In this example, nodes unverified by the relay node regarding whether the nodes are included in the neighbor list may not perform overhearing.

Figure 5:
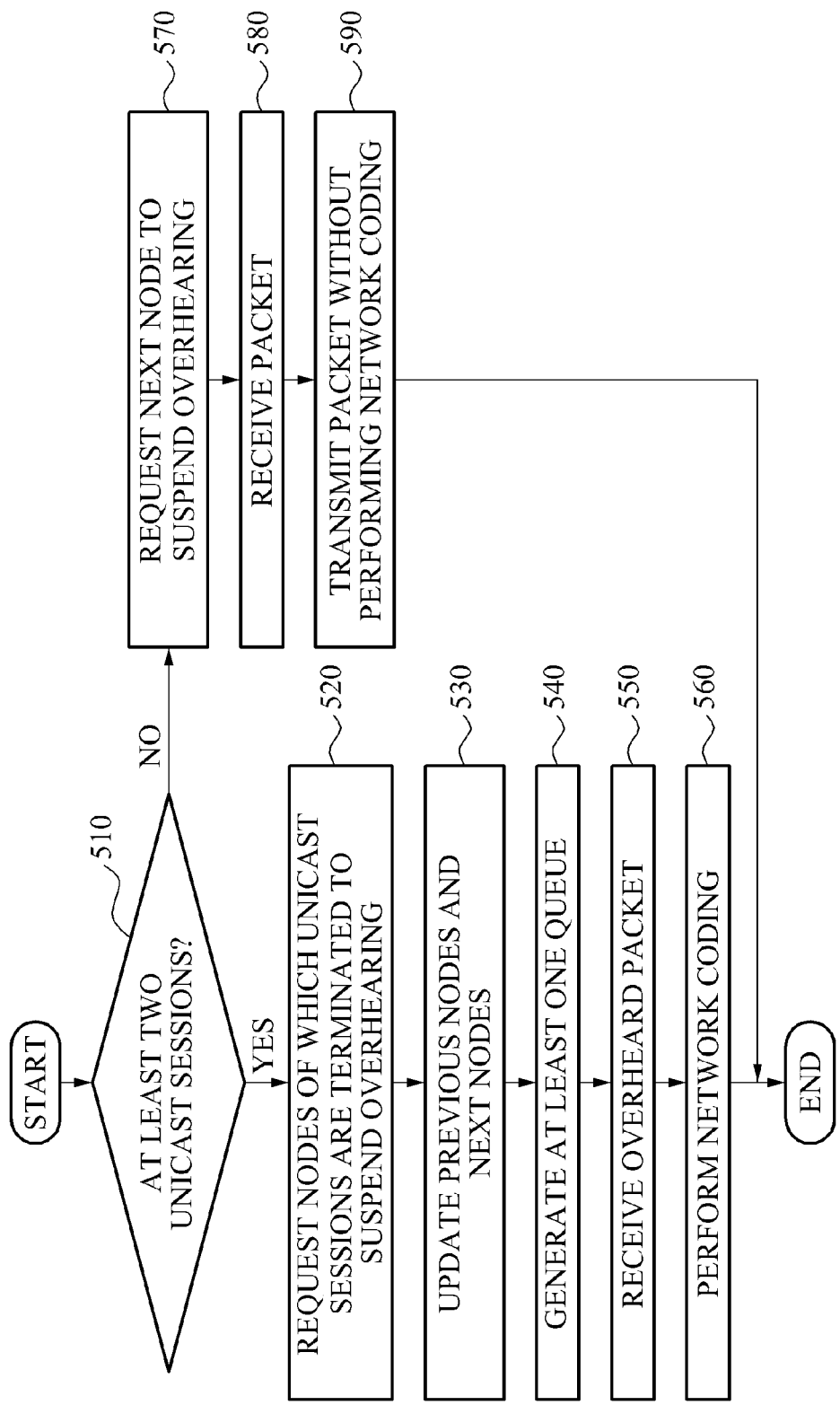
FIG. 5 is a diagram illustrating an example of a method of changing nodes capable of participating into network coding in response to a state of unicast sessions being changed.

FIG. 5 illustrates an example of a method of changing nodes capable of participating in network coding in response to a state of unicast sessions being changed.

A relay node may determine whether an execution state of at least two unicast sessions executed in one of a plurality of nodes is changed. In response to the execution state being changed, the relay node may change nodes capable of participating in network coding, or may terminate network coding.

Referring to FIG. 5, in response to a unicast session passing through the relay node being terminated, the relay node may determine whether at least two unicast sessions remain in operation 510.

In response to only a single unicast session remaining in operation 510, the relay node may perform communication without performing network coding in operations 570 through 590, which will be described later.

Conversely, in response to the at least two unicast sessions remaining in operation 510, the relay node may perform network coding with respect to the remaining at least two unicast sessions in operations 520 through 560.

In response to the at least two unicast sessions remaining in operation 510, the relay node may request nodes of which unicast sessions are terminated to suspend overhearing, based on the remaining at least two unicast sessions in operation 520.

For example, in operation 520, the relay node may request nodes of which the unicast sessions are terminated and which do not need to overhear a packet to suspend overhearing. The relay node may have a neighbor list containing information associated with neighbor nodes of each node and thus, may have no need to request a separate neighbor list.

In operation 530, the relay node may update previous nodes and next nodes based on the remaining at least two unicast sessions.

In operation 540, the relay node may generate at least one queue with respect to each of the previous nodes and the next nodes. In response to a single session including the relay node being terminated, and at least two sessions remaining, the relay node may generate a virtual queue, which is similar to a case in which a new session starts. At least one queue generated by the relay node will be described later with reference to FIG. 8.

In operation 550, the relay node may receive packets overheard by the updated next nodes.

In operation 560, the relay node may perform network coding using the packets overheard by the updated next nodes.

Figure 6:
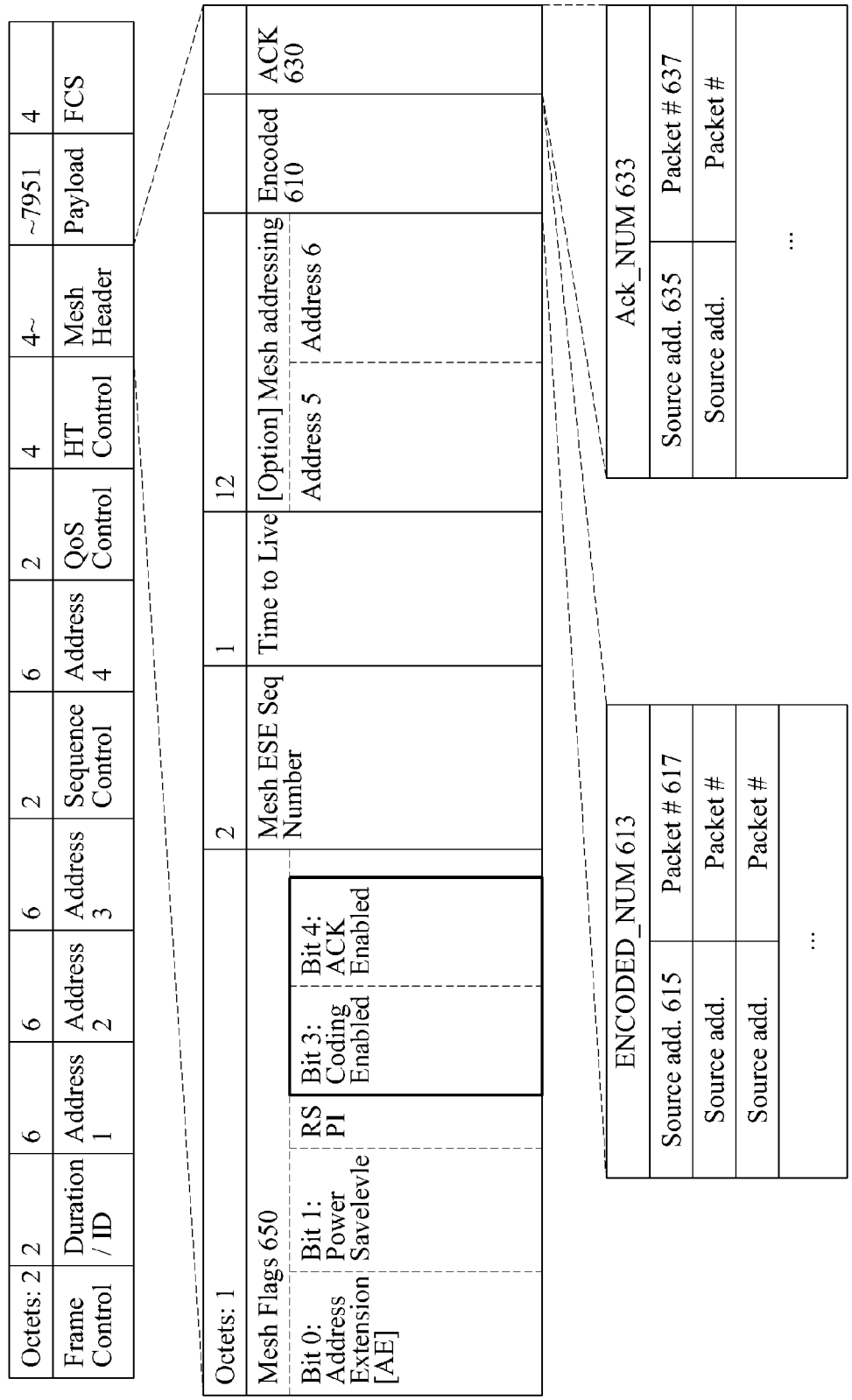
FIG. 6 is a diagram illustrating an example of a format of a packet header used in a communication method for network coding.

FIG. 6 illustrates an example of a format of a packet header used in a communication method for network coding.

Referring to FIG. 6, the packet header may include a first region Encoded 610, a second region ACK 630, and a flag region Mesh Flags 650.

In response to a relay node performing network coding with respect to a packet, the first region Encoded 610 may be used to transmit information associated with network coding. In this example, the first region Encoded 610 may include ENCODED_NUM 613, Source add. 615, and Packet #617.

ENCODED_NUM 613 indicates a number of network coded packets.

Source add. 615 indicates an address of each of one or more previous nodes transmitting the overheard packet.

Packet #617 indicates an identification number of a network coded packet.

In Packet #617, a corresponding value may increase when each of one or more nodes of each unicast session generates a packet.

The second region ACK 630 may be used to report to the relay node about information associated with a packet overheard by a next node. The second region ACK 630 may include Ack_NUM 633, Source add. 635, and Packet #637.

Ack_NUM 633 indicates a number of overheard packets when the next node informs the relay node about the overheard packet.

Source add. 635 indicates that the next node has overheard a packet broadcast from which node, that is, an address of a previous node having broadcasted the packet overheard by the next node.

Packet #637 indicates an identification number of the packet overheard by the next node.

The flag region Mesh flags 650 may indicate whether network coding is enabled with respect to the packet, or whether ACK is enabled.

For example, in the case of 802.11s, the packet header may be configured using a bit of a mesh flag.

Figure 7:
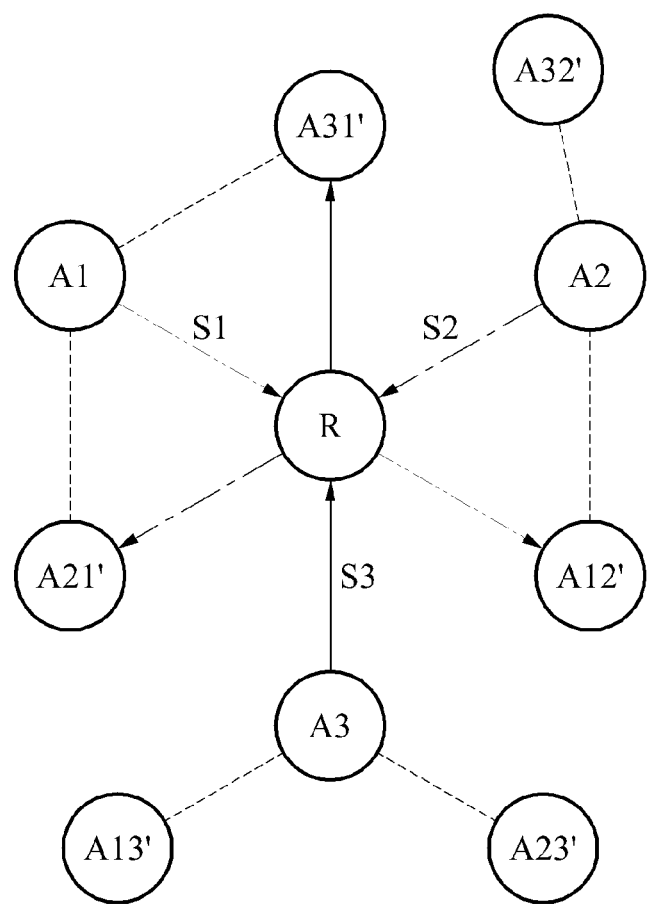
FIG. 7 is a diagram illustrating an example of a mesh network including a relay node.

FIG. 7 illustrates an example of a mesh network including a relay node.

Figure 8:
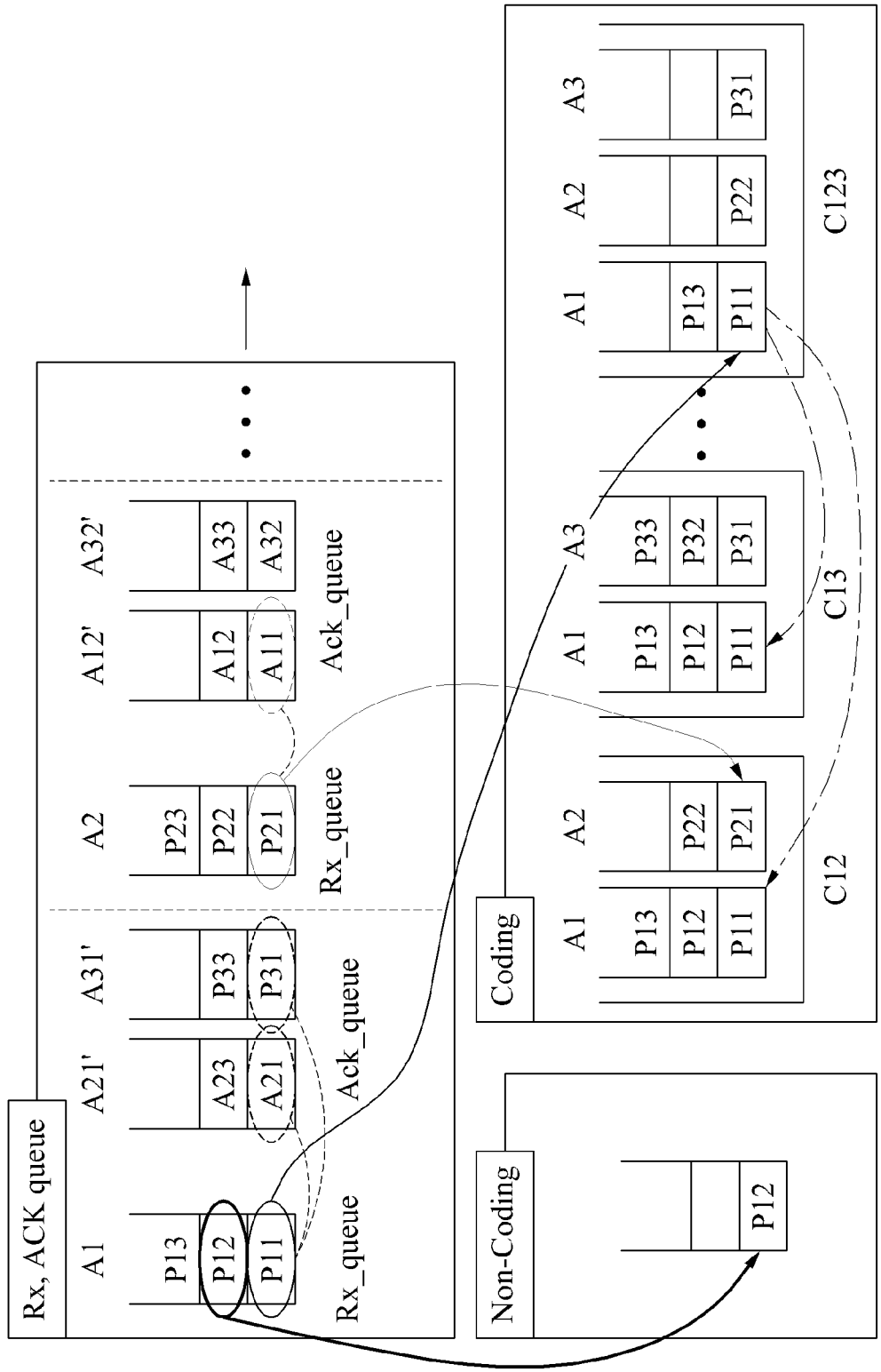
FIG. 8 is a diagram illustrating a method of managing, by the relay node of FIG. 7, at least one queue.

FIG. 8 illustrates a method of managing, by the relay node of FIG. 7, at least one queue.

Hereinafter, an example of managing, by a relay node, a queue in a case in which three unicast sessions S1, S2, and S3 intersect the single relay node will be described with reference to FIG. 7 and FIG. 8.

According to an example embodiment, the relay node may include a receiving queue (Rx_queue), an ACK queue (Ack_queue), a non-coding queue, a coding queue, and a transmitting queue (Tx_queue). Each queue may operate based on a first in first out (FIFO) scheme.

Rx_queue and Ack_queue may be managed for each of a previous node and a next node.

In response to the relay node receiving a packet, the relay node may verify a sender address and transmit a corresponding packet to a corresponding Rx_queue.

In response to the relay node receiving an ACK from a next node, an indication that the ACK is received from the next node may be stored in a corresponding Ack_queue.

With respect to each of previous nodes, the Ack_queue may manage information indicating that a corresponding ACK is received from which next node. Accordingly, the Ack_queue may be managed for each next node corresponding to each Rx_queue.

With respect to packets present in the Rx_queue, the relay node may verify the Ack_queue with respect to next nodes. In response there being no ACK corresponding to a corresponding packet, the relay node may transmit the corresponding packet to the non-coding queue.

When the ACK does exist, the relay node may transmit the corresponding packet to the coding queue.

The coding queue may be managed for each of all the probable coding combinations.

In response to three unicast sessions existing, four queues may be generated. A queue of a previous node may exist in a queue of each of the generated four queues.

For example, in the case of a mesh network of FIG. 7, a previous node A1 and a next node A21' or A31' may constitute a single pair, a previous node A2 and a next node A12' or A32' may constitute a single pair, and a previous node A3 and a next node A13' or A23' may constitute a pair.

In response to a packet being received from one of the previous nodes A1, A2, and A3, the relay node may verify an address of a node having transmitted the packet, and may store the packet in the Rx_queue corresponding to the verified node.

For example, P12 may indicate a packet secondly transmitted from the previous node A1, and A21 may indicate an ACK transmitted when reporting to the relay node information indicating that the next node A21' overheard P11.

When an ACK is received from one of the next nodes, for example, the next nodes A12', A21', and A31', the relay node may store the received ACK in the Ack_queue corresponding to the node having transmitted the ACK.

Accordingly, the Ack_queue may be a queue for managing information indicating which next node among a plurality of next nodes, for example, A21' and A31' has overheard a packet transmitted from each previous node, for example, A1 and then transmitted an ACK.

As illustrated in FIG. 8, with respect to Rx_queue corresponding to each of previous nodes, for example, A1, A2, and A3, an Ack_queue may be managed for each of the next nodes corresponding to each of the previous nodes.

For example, the relay node may transmit the packet P11 to the Rx_queue corresponding to the previous node A1. When an ACK A21 indicating that the next node A21' has overheard the packet P11 is received from the next node A21', the relay node may store the ACK A21 in the Ack_queue of the next node A21'.

With respect to packets present in the Rx_queue, the relay node may verify the Ack_queue of the next nodes. When an ACK corresponding to a corresponding packet is not stored, the relay node may transmit the corresponding packet to the non-coding queue.

Conversely, when an ACK corresponding to the packet is stored, the relay node may transmit the corresponding packet to a coding queue.

For example, in the case of the packet P11, an ACK A21 and ACK A31 are transmitted from the next nodes A21' and A31' of the previous node A1, and are stored in Ack_queue. Accordingly, the relay node may transmit the packet P11 to the coding queue.

In the case of the packet P12, since no ACK is transmitted from the next nodes A21' and A31' of the previous node A1 in this example, an ACK corresponding to the packet P12 may not be stored in Ack_queue. Accordingly, the relay node may transmit the packet P12 to the non-coding queue.

The relay node may store and manage a packet for each of all the probable coding combinations. For example, in a case in which three unicast sessions S1, S2, and S3 pass the relay node, the relay node may generate four queues corresponding to C12, C13, . . . , C123, and may combine queues of the previous nodes A1, A2, and A3 and then store the combined queues within each of the generated four queues.

Hereinafter, a dequeuing process of the Rx_queue and Ack_queue is described.

Referring to FIG. 8, an ACK A21 and ACK A31 with respect to the packet P11 stored in the Rx_queue of the previous node A1 are stored in the Ack_queue of the next nodes A21' and A31'. Accordingly, the relay node may transmit the packet P11 to the Rx_queue of C123 of the coding queue. C123 indicates a queue capable of coding packets of all the previous nodes A1, A2, and A3. Accordingly, when packets, for example, P22 and P31 are stored in the Rx_queue corresponding to the previous nodes A2 and A3 of C123, the packet P11 may be network coded together with the packets P22 and P31.

However, due to a difference, a change, and the like of a channel state, a packet may arrive late at the Rx_queue corresponding to the previous nodes A2 and A3 of C123. In this example, the packet P11 may not be coded, and thus may not be transmitted to a destination node. Accordingly, when the relay node transmits the packet 11 from the Rx_queue to the coding queue, the relay node may also transmit the packet 11 to other coding queues, for example, queues corresponding to C12 and C13.

In a case in which an ACK corresponding to a packet stored in an Rx_queue, for example, a packet P21, does not exist with respect to all the next nodes, and only an ACK A11 with respect to a portion of the next nodes, for example, A12', is stored, the packet P21 may be transmitted to only corresponding coding queues, for example, C12.

In a case in which an ACK corresponding to the packet, for example, the packet P12, does not exist, the relay node may transmit the packet P12 to the non-coding queue.

Figure 9:
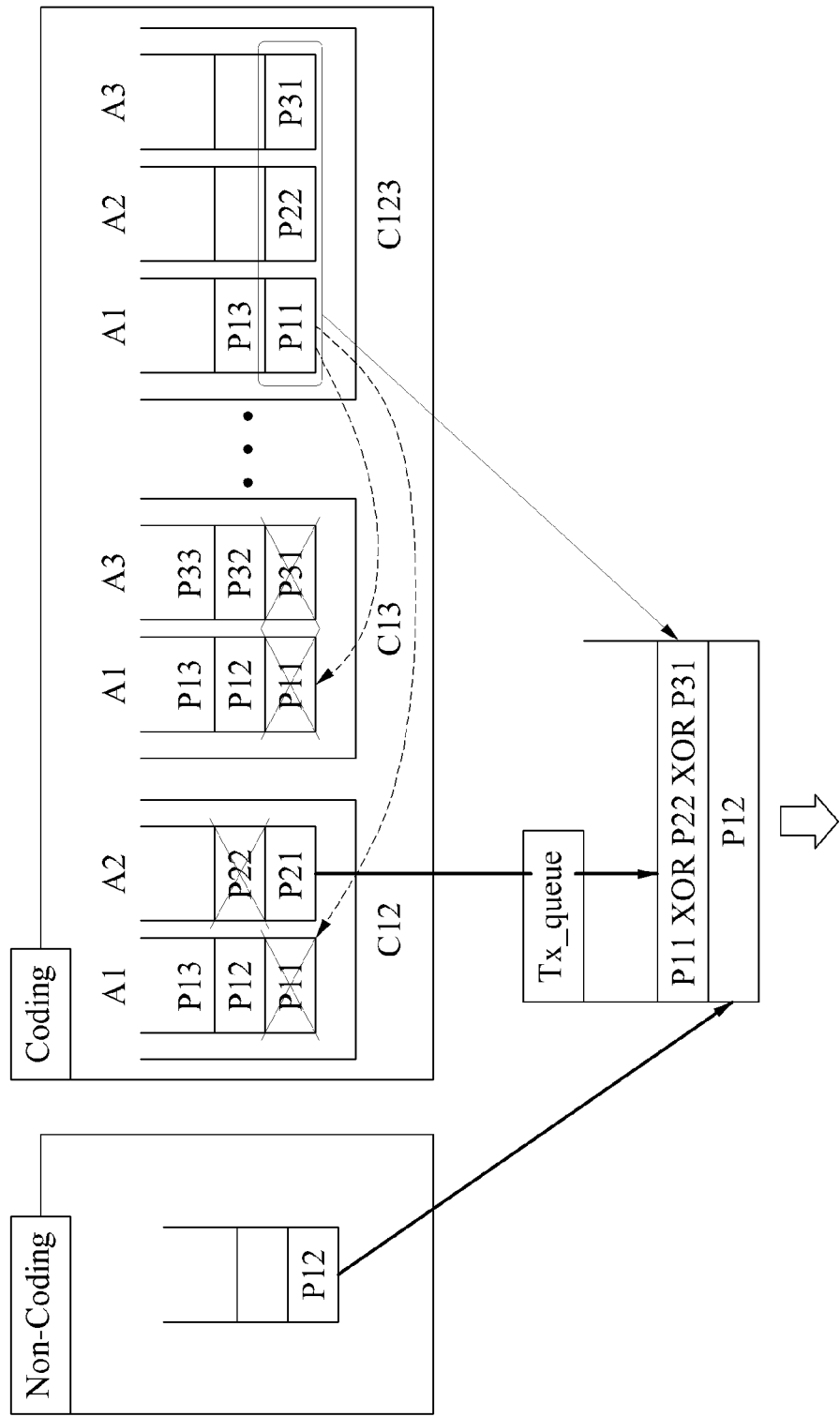
FIG. 9 is a diagram illustrating an example of a method of dequeuing packets present in a non-coding queue and a coding queue.

FIG. 9 illustrates an example of a method of dequeuing packets present in a non-coding queue and a coding queue.

Referring to FIG. 9, packets dequeued in the non-coding queue and the coding queue may be transmitted to a Tx_queue. In this case, packets present in the non-coding queue may be transmitted to the Tx_queue according to a FIFO scheme.

A relay node may transmit a packet present in the non-coding queue, for example, P12, to the Tx_queue according to the FIFO scheme.

A method of dequeuing packets present in the coding queue may include operations as described below.

Initially, among a plurality of queues C12, C13, . . . , C123 belonging to the coding queue, a priority may be assigned to a queue containing a largest number of packets for coding.

In a case in which an entity exists in each Rx_queue of C123, the relay node may perform an XOR operation with respect to corresponding packets and then transmit the operation result to the Tx_queue.

For example, when a number of packets P11, P22, and P31 stored in the Rx_queue of C123 corresponding to A1, A2, and A3 is as large as three, the relay node may perform an XOR operation of the packets P11, P22, and P31 and then transmit the operation result to the Tx_queue.

To prevent XOR operated packets P11, P22, and P31 from being coded with other packets again in the relay node, the relay node may delete the packets P11, P22, and P31 from other queues of the coding queue, for example, C12 and C13.

As described above, in a case in which a plurality of communication sessions intersect, and a relatively large number of packets can be coded, the relay node may perform coding based on a priority. The relay node may transmit a packet from the Tx_queue to a destination node according to a FIFO scheme.

In a case in which an overhear request is received from a relay node that is one of a plurality of nodes constituting a mesh network, a next node of the relay node may overhear a packet broadcast from each of previous nodes of the relay node in response to the overhear request. The next node of the relay node may transmit an ACK with respect to the overheard packet based on a time offset used to overhear the packet and a number of overheard packets.

Hereinafter, a method of transmitting, by the next node of the relay node, an ACK with respect to the overheard packet based on the time offset will be described with reference to FIG. 10, and a method of transmitting, by the next node of the relay node, an ACK with respect to the overheard packet based on the number of overheard packets will be described with reference to FIG. 11.

Figure 10:
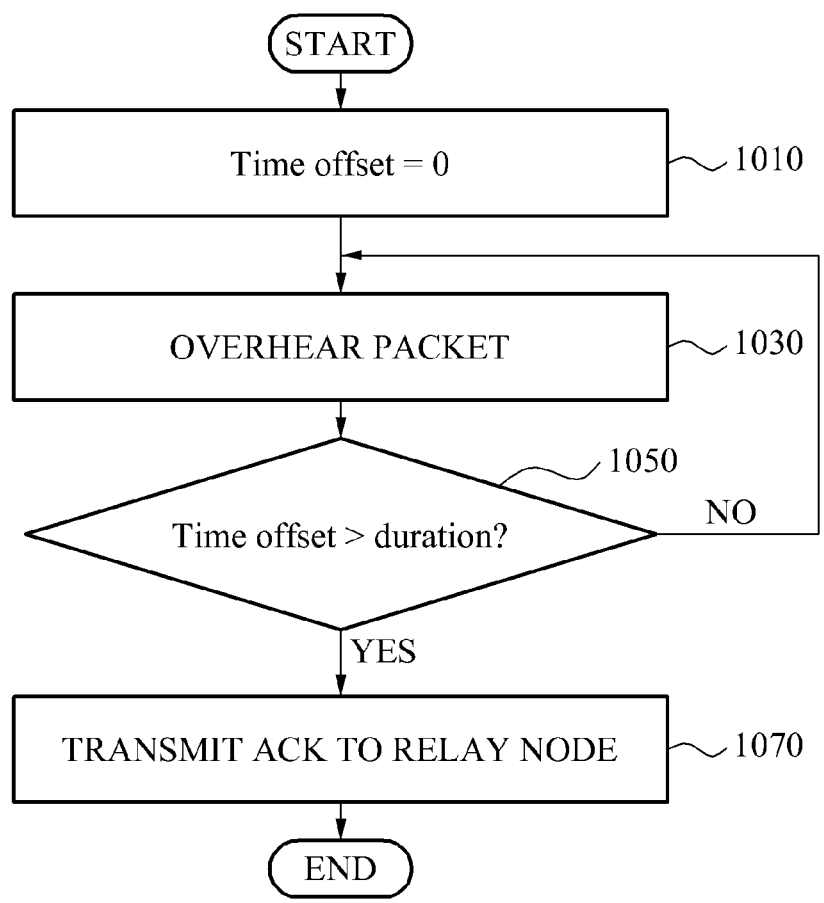
FIG. 10 is a diagram illustrating an example of transmitting, by a next node of a relay node, a cumulative acknowledgment (ACK) to the relay node based on a length of time.

FIG. 10 illustrates an example of transmitting, by a next node of a relay node, a cumulative ACK to the relay node based on a length of time.

Referring to FIG. 10, the next node of the relay node may set a time offset to "0" in operation 1010, and may overhear a packet transmitted from a previous node of the relay node for a predetermined period of time in operation 1030. The next node of the relay node may transmit, to the relay node, an ACK with respect to the overheard packet.

In operation 1050, the next node of the relay node may compare the time offset with a predetermined duration in operation 1050.

In a case in which the time offset is greater than the predetermined duration in operation 1050, the next node of the relay node may generate the ACK with respect to the overheard packet and transmit the generated ACK to the relay node in operation 1070.

In a case in which the time offset increases to be greater than the predetermined duration while generating the ACK, the next node of the relay node may transmit the ACK to the relay node and then reset the time offset to "0".

Figure 11:
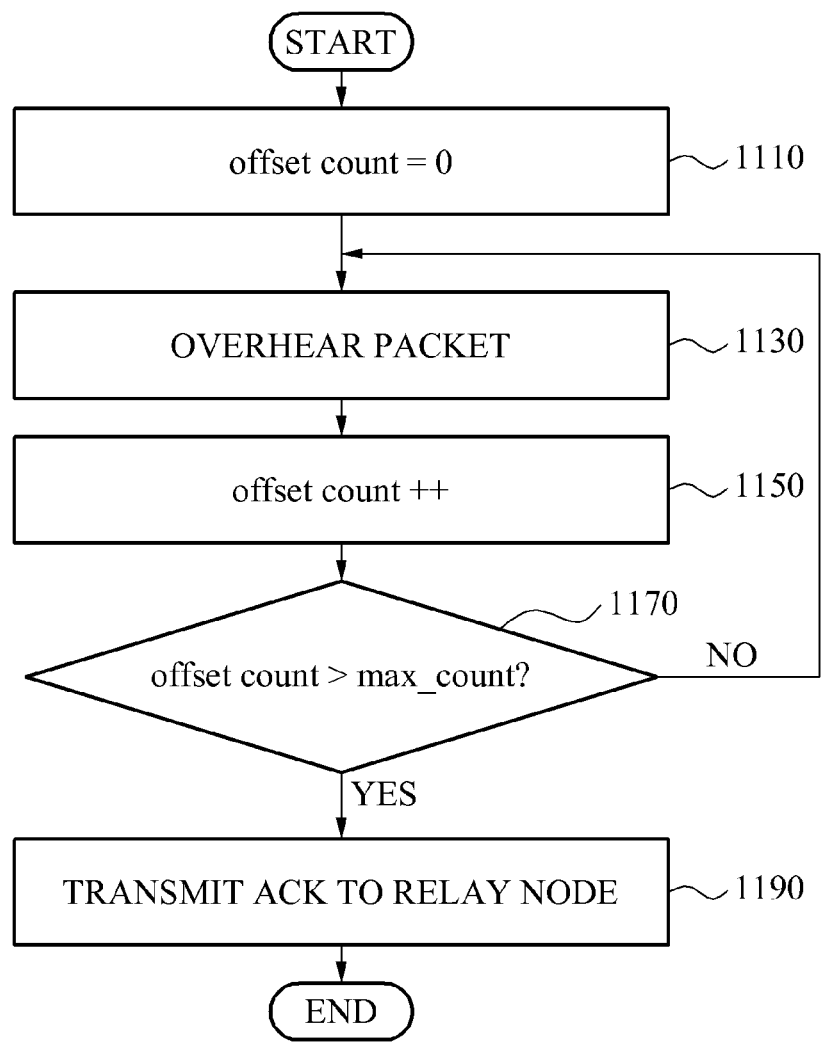
FIG. 11 is a diagram illustrating an example of a method of transmitting, by a next node of a relay node, a cumulative ACK to the relay node based on a number of overheard packets.

FIG. 11 illustrates an example of a method of transmitting, by a next node of a relay node, a cumulative ACK to the relay node based on a number of overheard packets.

Referring to FIG. 11, in operation 1110, the next node of the relay node may set an offset count to "0". In this example, the offset count is used to count a number of packets overheard from a single relay node.

In operation 1130, the next node of the relay node may overhear a packet. In operation 1150, the next node of the relay node may increase the offset count by one for each overheard packet.

In operation 1170, it is determined whether the number of overheard packets is greater than a predetermined threshold value max_count. If it is determined that the offset count is greater than the predetermined treshold value max_count, the next node of the relay node may generate an ACK with respect to the overheard packets and transmit the ACK to the relay node in operation 1190.

Conversely, if it is determined that the number of overheard packets, i.e., the offset count, is less than or equal to the predetermined threshold value max_count, the next node of the relay node may continue to overhear packets from the relay node while continuously increasing the offset count.

Attendant to generating the ACK, the next node of the relay node may form a header of the packet for the ACK using a bitmap, which will be further described with reference to FIG. 12.

Figure 13:
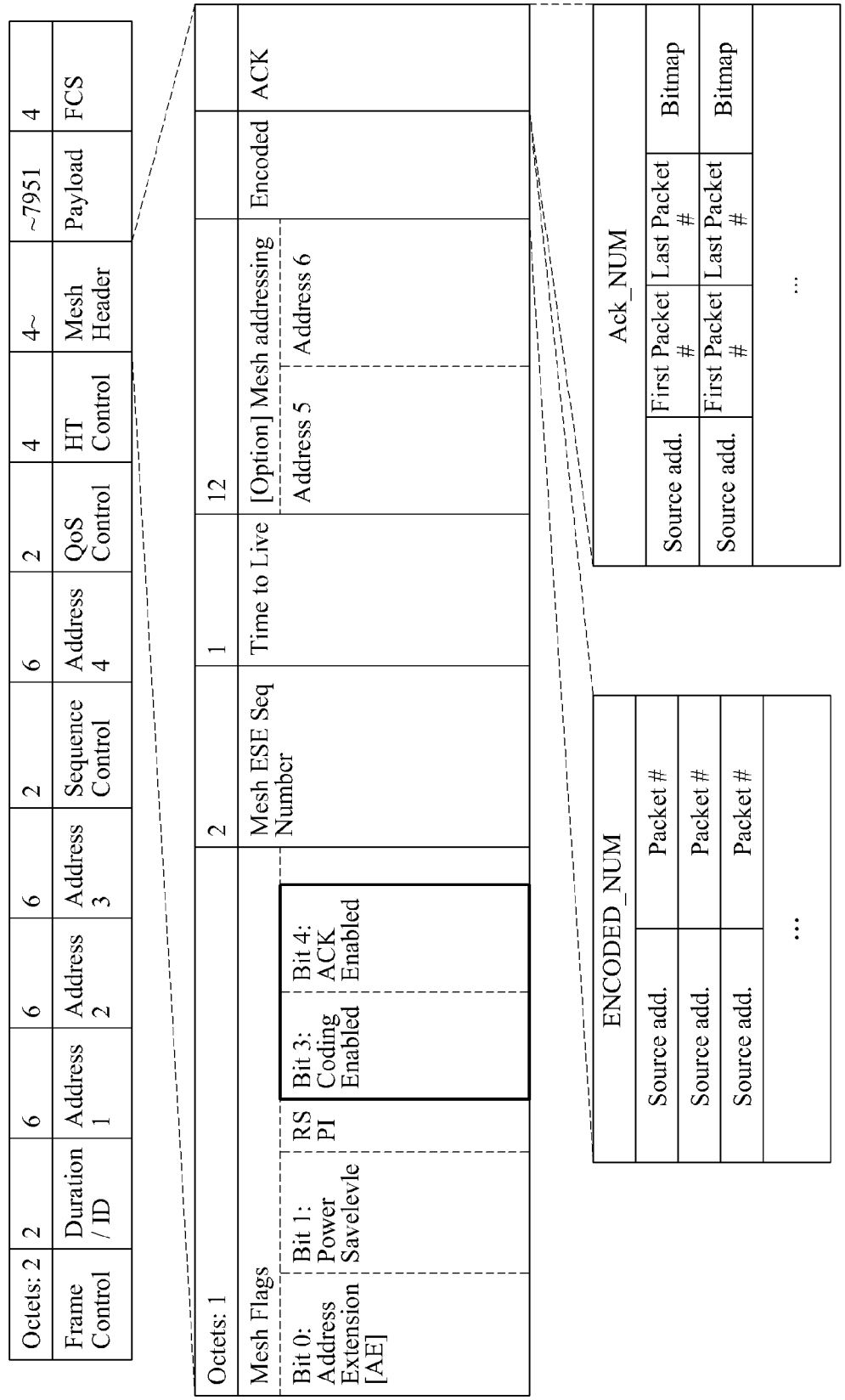
FIG. 13 is a diagram illustrating an example of a header format of 802.11 for a cumulative ACK using a bitmap.

FIG. 12 illustrates an example of a header of a packet to transmit a cumulative ACK using a bitmap, and FIG. 13 illustrates an example of a header format of 802.11 for a cumulative ACK using a bitmap.

Referring to FIG. 12 and FIG. 13, a header format using a bitmap for transmitting a cumulative ACK may be utilized as described below.

The cumulative ACK of FIGS. 10 and 11 may be managed in a relay node for each source address of each previous node as illustrated in Source add.1233.

First Packet #1235 indicates a first packet transmitting ACK for each source address.

Last Packet #1237 indicates a last packet transmitting ACK for each source address.

Whether each of packets is received may be expressed using the bitmap by including the first packet number and the last packet number.

For example, when it is assumed that First Packet #=5, Last Packet #=10, and bitmap=101011, it is indicated that packets #5, 7, 9 and 10 are received, and packets #6 and 8 are not received.

Further descriptions related to the header format may refer to the descriptions made above with reference to FIG. 6.

FIG. 13 illustrates an example of applying a header of the above cumulative ACK to a header of 802.11.

The processes, functions, methods and/or software described above including a communication method of a relay node for network coding may be recorded, stored, or fixed in one or more non-transitory computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a non-transitory computer-readable storage medium may be distributed among computer systems connected through a network and non-transitory computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of a relay node for network coding, the method comprising:
   verifying whether a second next node of the relay node is a neighbor of a previous node of the relay node;
   requesting the second next node to overhear a packet transmitted by the previous node;
   receiving the packet from the previous node that is to be subsequently transmitted to a next node;
   receiving an acknowledgment from the second next node indicating that the packet transmitted by the previous node and subsequently intended for the next node was overheard by the second next node, in response to the second next node overhearing the packet and verifying a sender address of the packet corresponds to the previous node;
   determining that the second next node is a node on a path from the relay node that is capable of participating in the network coding based on an acknowledgment transmitted by the second next node; and
   performing the network coding on the overheard packet received by the second next node based on the acknowledgment received from the second next node;
   wherein each of the previous nodes of the relay node and the next nodes of the relay node generates a neighbor list containing information associated with neighbor nodes, and the verifying comprises:
   requesting, by the relay node, the previous nodes of the relay node to transmit the neighbor list, and
   verifying, by the relay node using the neighbor lists, whether the next nodes of the relay node are the neighbors of the previous nodes of the relay node;
   wherein, in response to the relay node performing network coding with respect to a packet, a header of the packet includes a first area including information associated with the network coding, a second area including information associated with the packet overheard by a next node of the relay node, and a flag indicating whether the network coding is enabled with respect to the packet or whether an acknowledgement is enabled with respect to the packet.

2. The communication method of claim 1, further comprising:
   determining whether at least two unicast sessions are executed in one of the plurality of nodes; and
   determining, as the relay node to perform network coding, the one node in which the at least two unicast sessions are executed.

3. The communication method of claim 1, further comprising:
   determining, as the nodes capable of participating into the network coding, the next nodes of the relay node and the previous nodes of the relay node in response to the next nodes of the relay node being the neighbors of the previous nodes of the relay node.

4. The communication method of claim 3, wherein:
   each of the previous nodes of the relay node and the next nodes of the relay node generates a neighbor list containing information associated with neighbor nodes, and
   the verifying comprises:
   periodically receiving, by the relay node from each of the previous nodes of the relay node, the neighbor list of each corresponding previous node, and
   verifying, by the relay node using the neighbor lists, whether the next nodes of the relay node are the neighbors of the previous nodes of the relay node.

5. The communication method of claim 2, further comprising:
   determining whether an execution state of the at least two unicast sessions is changed; and
   changing the second next node on the path from the relay node that is capable of participating in the network coding, or terminating the network coding in response to the execution state of the at least two unicast sessions being changed.

6. A communication method of a relay node for network coding, the method comprising:
   determining one of a plurality of nodes included in a mesh network to be a relay node to perform network coding;

receiving a packet from a previous node that is to be subsequently transmitted to a next node, and receiving an acknowledgement from a second next node indicating that the packet transmitted by the previous node and subsequently intended for the next node was overheard by the second next node, in response to the second next node overhearing the packet and verifying a sender address of the packet corresponds to the previous node;

determining, by the relay node, that the second next node is a node on a path from the relay node that is capable of participating in the network coding based on an acknowledgement transmitted by the second next mode; and performing, by the relay node, the network coding on the overheard packet received by the second next node based on the acknowledgement received from the second next node, wherein the determining of the relay node comprises:

determining whether at least two unicast sessions are executed in one of the plurality of nodes; and determining, as the relay node, the one node in which the at least two unicast sessions are executed, wherein the method further comprising:

determining whether an execution state of the at least two unicast sessions is changed; and changing the second next node on the path from the relay node that is capable of participating in the network coding, or terminating the network coding in response to the execution state of the at least two unicast sessions being changed, and wherein the determining whether the execution state is changed comprises:

determining whether the at least two unicast sessions passing through the relay node remain;

requesting nodes of which the at least two unicast sessions are terminated among the next nodes of the relay node to suspend overhearing, based on the remaining at least two at least two unicast sessions;

updating the previous nodes of the relay node and the next nodes of the relay node based on the remaining at least two unicast sessions; and performing the network coding using packets overheard by the updated next nodes of the relay node.

7. The communication method of claim 1, further comprising:

generating at least one queue with respect to each of previous nodes of the relay node and next nodes of the relay node.

8. The communication method of claim 1, wherein the first area includes a number of network coded packets, an address of a previous node of the relay node receiving the overheard packet, and an identification number of a network coded packet.

9. The communication method of claim 1, wherein the second area includes a number of packets overheard by the next node of the relay node, an address of a previous node broadcasting a packet overheard by a corresponding next node, and an identification number of the overheard packet.

10. A non-transitory computer-readable medium comprising a program for instructing a computer to perform the method of claim 1.

* * * * *